United States Patent
Vadari et al.

(10) Patent No.: US 8,057,175 B2
(45) Date of Patent: Nov. 15, 2011

(54) ACTIVE CONTROL OF A WIND TURBINE BLADE

(75) Inventors: Harith Vadari, Bangalore (IN); Sreedhar Desabhatla, Munich (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/944,267

(22) Filed: Nov. 11, 2010

(65) Prior Publication Data

US 2011/0142624 A1    Jun. 16, 2011

(51) Int. Cl.
*F03D 7/04*    (2006.01)

(52) U.S. Cl. .............. 416/61; 416/35; 416/37; 416/42

(58) Field of Classification Search .............. 416/1, 37, 416/35, 42, 61
See application file for complete search history.

(56) References Cited

U.S. PATENT DOCUMENTS

| | | | |
|---|---|---|---|
| 5,791,869 A * | 8/1998 | Lee | 415/119 |
| 5,961,080 A | 10/1999 | Sinha | |
| 6,109,566 A | 8/2000 | Miller et al. | |
| 6,371,414 B1 | 4/2002 | Truax et al. | |
| 6,412,732 B1 | 7/2002 | Amitay et al. | |
| 7,387,491 B2 | 6/2008 | Saddoughi et al. | |
| 7,863,767 B2 * | 1/2011 | Chapple et al. | 290/54 |
| 7,883,313 B2 * | 2/2011 | Nies et al. | 415/121.2 |
| 2002/0195526 A1 | 12/2002 | Barrett et al. | |
| 2008/0317598 A1 | 12/2008 | Barbu et al. | |
| 2010/0143118 A1* | 6/2010 | Eggleston et al. | 416/1 |
| 2010/0209257 A1* | 8/2010 | Fuglsang et al. | 416/90 R |
| 2010/0266382 A1* | 10/2010 | Campe et al. | 415/1 |

* cited by examiner

*Primary Examiner* — Ninh H Nguyen
(74) *Attorney, Agent, or Firm* — James McGinness, Esq.; Armstrong Teasdale LLP

(57) ABSTRACT

A method and system for increasing power production of a wind turbine including a rotor, at least one rotor blade coupled to the rotor, at least one sensor, and a controller communicatively coupled to the sensor. A flow parameter of the rotor blade is detected, and operation of the wind turbine is controlled to reduce a flow separation at the rotor blade based at least partially on the flow parameter of the rotor blade.

18 Claims, 3 Drawing Sheets

ACTIVE CONTROL OF A WIND TURBINE BLADE

BACKGROUND OF THE INVENTION

The subject matter described herein relates generally to operating a wind turbine and, more particularly, to methods and systems for increasing power production of the wind turbine.

Wind turbines have been receiving increased attention for being environmentally safe and relatively inexpensive alternative energy sources. With the growing interest in alternative energy sources, considerable efforts have been made to develop wind turbines that are reliable and efficient. At least some known wind turbines include a rotor that transforms wind energy into a rotational torque that drives one or more generators.

At least some known rotors are coupled to a plurality of wind turbine blades. At least some known wind turbine blades are subject to a flow separation, which may result in stalling, a driving torque reduction, and/or a power production loss of the wind turbine.

BRIEF SUMMARY OF THE INVENTION

In one aspect, a method is provided for increasing power production of a wind turbine including a rotor, at least one rotor blade coupled to the rotor, at least one sensor, and a controller communicatively coupled to the sensor. The method includes detecting, using the sensor, an airflow parameter of the rotor blade. The controller is used to control operation of the wind turbine to reduce a flow separation at the rotor blade based at least partially on the airflow parameter of the rotor blade.

In another aspect, a controller is provided for increasing power production of a wind turbine including a rotor, at least one rotor blade coupled to the rotor, and at least one sensor operatively coupled to the rotor blade. The controller is configured to receive, from the sensor, data indicative of an airflow parameter of the wind turbine blade. Operation of the wind turbine is controlled to reduce a flow separation at the rotor blade based at least partially on the airflow parameter of the rotor blade.

In yet another aspect, a system is provided for increasing power production of a wind turbine. The system includes a rotor, at least one rotor blade coupled to the rotor, at least one sensor configured to detect an airflow parameter of the rotor blade, and a controller communicatively coupled to the sensor. The controller is configured to receive, from the sensor, data indicative of the airflow parameter of the rotor blade. Operation of the wind turbine is controlled to reduce a flow separation at the rotor blade based at least partially on the airflow parameter of the rotor blade.

DETAILED DESCRIPTION OF THE INVENTION

The methods and systems described herein relate generally to operating a wind turbine and, more particularly, to methods and systems for increasing power production of the wind turbine. In one embodiment, a flow separation at a surface of a wind turbine blade is actively controlled to prevent and/or delay stalling of the blade. As used herein, "flow separation" is intended to represent an occurrence of a velocity gradient of airflow traveling against an adverse pressure gradient at the surface approaching zero.

For example, flow separation occurs at a "separation point" when a solid object, such as a rotor blade, is exposed to a moving fluid, such as air. As described herein, the shear stress on a surface of the solid object is approximately zero at the separation point. Moreover, as described herein, "reattachment point" represents a location where the pressure gradient at the object surface becomes less than zero in the direction of airflow. The zone between the "separation point" and the "reattachment point" is sometimes referred to as the "separation zone". "Separation bubbles" may be located with the separation zone.

In some embodiments, the airflow becomes detached from the rotor blade surface, resulting in a decrease in lift force and/or an increase in drag force of the rotor blade. The methods and systems described herein enable delaying flow separation, increasing lift force, and/or decreasing drag force of the rotor blade to facilitate increasing the power production of the wind turbine.

Figure 1:
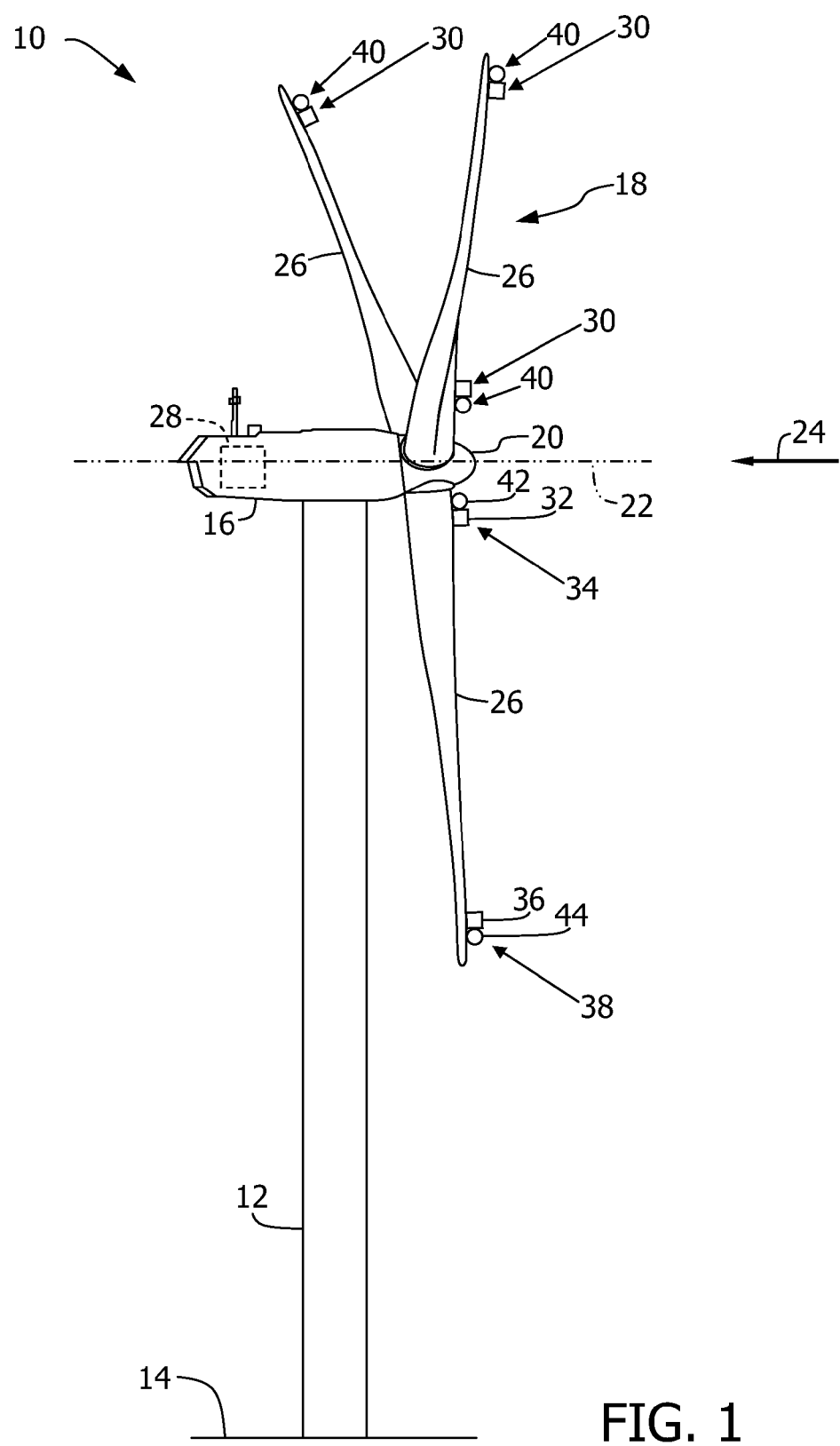
FIG. 1 is a perspective view of an exemplary wind turbine.

FIG. 1 is a perspective view of an exemplary wind turbine 10. As used herein, the term "wind turbine" is intended to be representative of any device that generates rotational energy from wind energy, and more specifically, converts kinetic energy of wind into mechanical energy. In the exemplary embodiment, wind turbine 10 is a wind turbine generator for generating electrical power from wind energy. As used herein, the term "wind turbine generator" is intended to be representative of any wind turbine that generates electrical power from rotational energy generated from wind energy, and more specifically, converts mechanical energy converted from kinetic energy of wind to electrical power.

In the exemplary embodiment, wind turbine 10 includes a tower 12 extending from a supporting surface 14 and a nacelle 16 mounted on tower 12. Tower 12 may be any suitable type of tower and may be fabricated from any suitable material. In the exemplary embodiment, tower 12 is fabricated from tubular steel such that a cavity (not shown) is defined between supporting surface 14 and nacelle 16. A height of tower 12 may be any suitable height enabling wind turbine 10 to function as described herein.

In the exemplary embodiment, a rotor 18 is coupled to nacelle 16 and includes a hub 20 rotatable about an axis of rotation 22. Wind turbine 10 and/or rotor 18 may be positioned at any angle with respect to a direction 24 of the wind to harness wind energy therefrom. In the exemplary embodiment, wind turbine 10 is a horizontal-axis wind turbine and rotor 18 generally faces upwind or downwind to harness wind energy.

In the exemplary embodiment, rotor 18 includes at least one rotor blade 26 coupled to and extending outwardly from hub 20. As used herein, the term "blade" is intended to be representative of any device that provides a reactive force when in motion relative to a surrounding fluid. In the exemplary embodiment, rotor blades 26 are spaced about hub 20 to facilitate rotating rotor 18 about axis of rotation 22 to enable kinetic energy to be transferred from the wind into usable mechanical energy, and subsequently, electrical energy. Loads induced to rotor blades 26 are transferred to hub 20.

In the exemplary embodiment, a controller 28, described in further detail below, is communicatively coupled to a plurality of the components of wind turbine 10 for generally monitoring and controlling operation of wind turbine 10 and/or some or all of the components thereof. For example, in the exemplary embodiment, as an airflow parameter changes, controller 28 may control operation of wind turbine 10 based on the change in the airflow parameter. Such airflow parameters include a quantitative feature of the airflow including, without limitation, an air pressure, an air pressure gradient, a wind velocity, a wind velocity gradient, a wind direction, a wind shear, a turbulence intensity, an air humidity, and/or an air temperature. Alternative distributed or centralized control architectures may be used in certain embodiments.

In the exemplary embodiment, wind turbine 10 also includes at least one sensor 30, such as sensors 32 and 36 shown in FIG. 1, for detecting and/or measuring an airflow parameter. For example, in the exemplary embodiment, each sensor 30 is configured to detect a shear stress of rotor blade 26. As used herein, "shear stress" is a non-normal (i.e., parallel or tangential) stress applied to a face of a material, such as rotor blade 26, and represents an effect of mixing fluid. A fluid, such as air, moving along rotor blade 26 incurs a shear stress. Based on the shear stress detected by sensor 30, in the exemplary embodiment, a separation of airflow from a surface of robot blade 26, referred to herein as "flow separation," may be determined. For example, in the exemplary embodiment, a flow separation occurs when sensor 30 detects a shear stress of rotor blade 26 of approximately zero. Alternatively, sensor 30 may be configured to detect any suitable airflow parameter including, without limitation, an air pressure, an air pressure gradient, a wind velocity, a wind velocity gradient, a wind direction, a wind shear, a turbulence intensity, an air humidity, and/or an air temperature.

Moreover, sensor 30 may be configured to detect an operating parameter of wind turbine 10. The operating parameter may include, without limitation, a pitch angle of rotor blade 26 and/or an electrical output of a wind turbine generator (not shown). As used herein, the term "pitch angle" is intended to be representative of an angle of rotor blade 26 with respect to hub 20 and/or wind direction 24. Alternatively or additionally, sensor 30 may be configured to detect, without limitation, any ambient condition, displacement, yaw, pitch, moment, strain, stress, twist, damage, failure, rotor torque, rotor speed, electrical load, and/or power of wind turbine 10 and/or its components.

Sensor 30 may be coupled to any suitable location within or remote to wind turbine 10. In the exemplary embodiment, a location of sensor 30 is based on at least an airflow velocity, an airflow velocity gradient, a pressure, a pressure gradient, a rotor blade geometry, a rotor blade span, a wall shear stress, and/or a Reynolds number. As used herein, "Reynolds number" is intended to be representative of a ratio of inertial forces to viscous forces of airflow on rotor blade 26. More specifically, in the exemplary embodiment, sensor 30 is located within the separation zone and a distribution of sensors 30 may be based on at least a size of the separation bubble. For example, in the exemplary embodiment, a first sensor 32 is coupled to a first portion 34 of rotor blade 26, and a second sensor 36 is coupled to a second portion 38 of rotor blade 26. In the exemplary embodiment, sensor 30 is coupled in electronic data communication to controller 28 for sending airflow parameter signals and/or operating parameter signals to controller 28.

In the exemplary embodiment, wind turbine 10 includes at least one actuator 40 configured to stimulate and/or actuate at least one rotor blade 26. As such, actuator 40 facilitates disrupting the airflow proximate rotor blade 26 and, thus, delaying flow separation of the airflow. Actuator 40 may include, without limitation, any suitable structure, configuration, arrangement, means, and/or components, whether described and/or illustrated herein, such as electrical motors, hydraulic cylinders, springs, piezoelectric actuators, and/or servo-mechansims. Moreover, actuator 40 may be driven by any suitable means, whether described and/or illustrated herein, including, without limitation, hydraulic fluid, electrical power, electro-chemical power, and/or mechanical power, such as spring force.

Actuator 40 may suitably stimulate rotor blade 26 to increase a lift force and/or decrease a drag force of rotor blade 26 to facilitate increasing power production of wind turbine 10. For example, in the exemplary embodiment, actuator 40 is configured to vibrate rotor blade 26 by means of pressure pulses. Additionally, actuator 40 may be configured to rotate rotor blade 26 for controlling a pitch angle of rotor blade 26 with respect to wind direction 24. In one embodiment, sensor 30 is configured to detect the stimulation of rotor blade 26, and a signal representative of the stimulation is transmitted to controller 28. As such, controller 28 is able to receive feedback associated with the stimulation of rotor blade 26. In such an embodiment, controller 28 receives the signal and is configured to adjust the stimulation of rotor blade 26 based on at least the feedback provided by sensor 30.

Actuator 40 may be coupled to any suitable location within or remote to wind turbine 10. In the exemplary embodiment, a location of actuator 40 is based on at least an airflow velocity, an airflow velocity gradient, a pressure, a pressure gradient, a rotor blade geometry, a rotor blade span, a wall shear stress, and/or a Reynolds number. More specifically, in the exemplary embodiment, actuator 40 is located within the separation zone and a distribution of actuators 40 may be based on at least a size of the separation bubble. For example, in the exemplary embodiment, a first actuator 42 is coupled to first portion 34 of rotor blade 26, and second actuator 44 is coupled to a second portion 38 of rotor blade 26 to enable selectively stimulating first portion 34 and/or second portion 38 based on an airflow parameter and/or operating parameter detected by first sensor 32 and/or second sensor 36. In the exemplary embodiment, actuator 40 is coupled in electronic data communication to controller 28 for processing and/or receiving suitable signals from controller 28.

Figure 2:
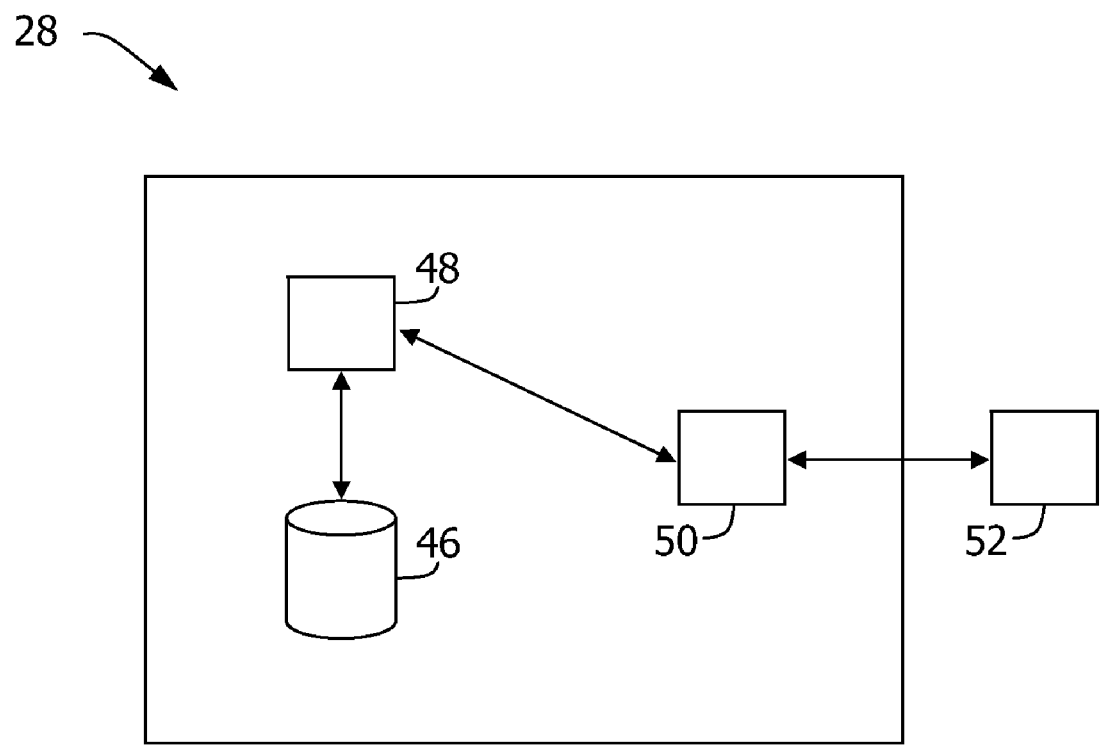
FIG. 2 is a block diagram of an exemplary controller suitable for use with the wind turbine shown in FIG. 1.

FIG. 2 is a block diagram of controller 28 including a memory device 46 and a processor 48 coupled to memory device 46 for executing programmed instructions. Processor 48 may include one or more processing units (e.g., in a multi-core configuration). In one embodiment, executable instructions and/or operating data are stored in memory device 46. For example, in the exemplary embodiment, memory device 46 stores at least one flow equation for use in estimating a separation point, a reattachment point, a separation zone and/or a separation bubble. Such an equation enables controller 28 to selectively actuate actuator 40 to induce energy into the airflow and, thus, control flow separation. Controller 28 is programmable to perform one or more operations described herein by programming memory device 46 and/or processor 48. For example, processor 48 may be programmed by encoding an operation as one or more executable instructions and providing the executable instructions in memory device 46.

Processor 48 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Memory device 46, as described herein, is one or more devices that enable information such as executable instructions and/or other data to be stored and retrieved. Memory device 46 may include one or more computer readable media, such as, without limitation, dynamic random access memory (DRAM), static random access memory (SRAM), a solid state disk, and/or a hard disk. Memory device 46 may be configured to store, without limitation, executable instructions, operating data, and/or any other type of data suitable for use with the methods and systems described herein.

In the exemplary embodiment, controller 28 includes a communication interface 50 coupled to memory device 46 and/or processor 48. Communication interface 50 is coupled in communication with a remote device 52, such as sensor 30, actuator 40, and/or another controller 28. For example, communication interface 50 may include, without limitation, a wired network adapter, a wireless network adapter, and/or a mobile telecommunications adapter.

Figure 3:
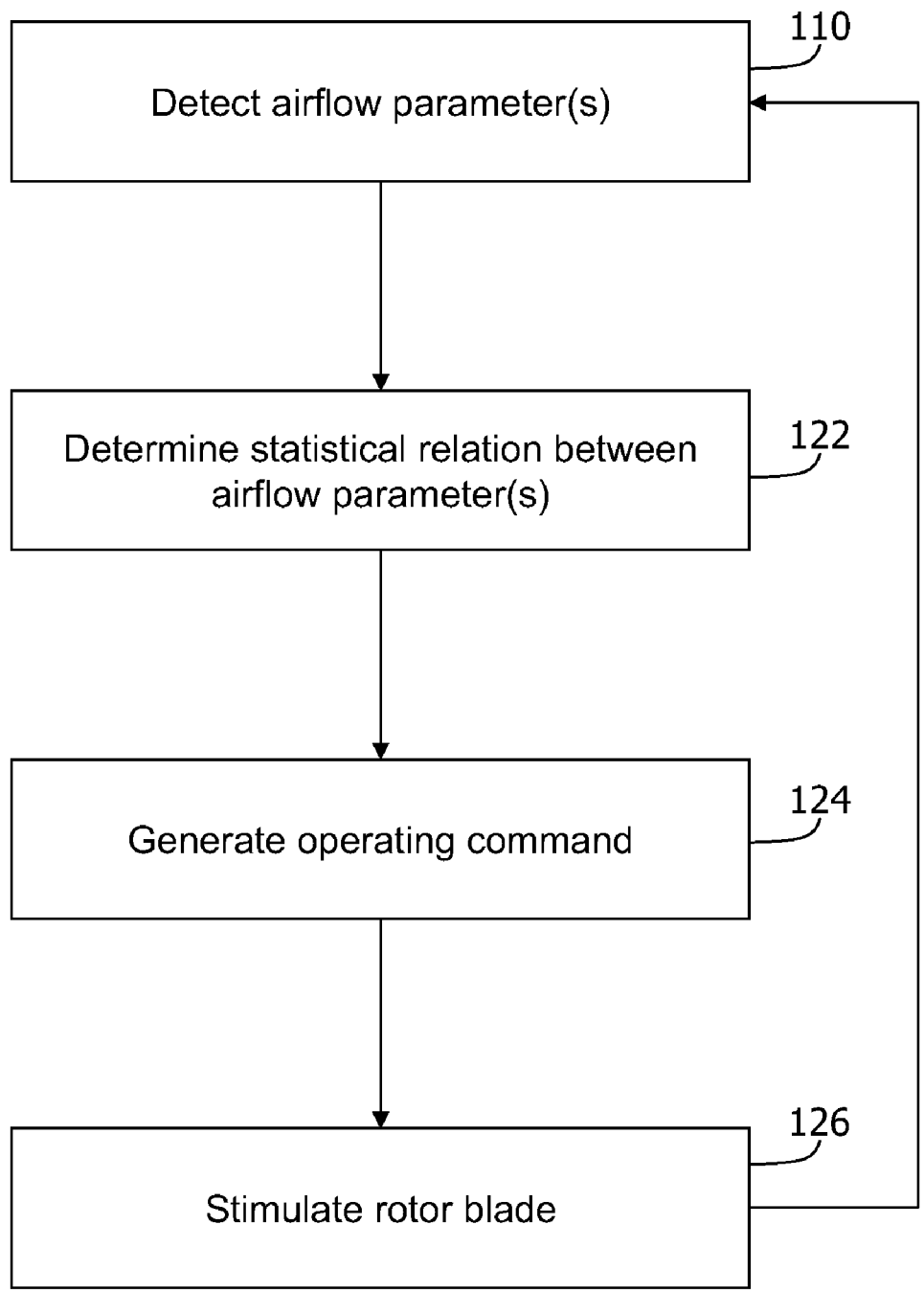
FIG. 3 is a flowchart of an exemplary method for reducing a flow separation at a rotor blade of the wind turbine shown in FIG. 1 using the controller shown in FIG. 2.

FIG. 3 is a flowchart illustrating an exemplary method 100 for controlling a wind turbine, such as wind turbine 10 (shown in FIG. 1). In the exemplary embodiment, method 100 includes detecting 110 a flow parameter of rotor blade 26. For example, in one embodiment, sensor 30 may detect 110 a pressure, a pressure gradient, a velocity, and/or a velocity gradient of rotor blade 26. In the exemplary embodiment, the detection 110 of the flow parameter is conducted in a continuous and dynamic manner and may be statically stored electronically within memory device 46.

In the exemplary embodiment, controller 28 controls an operation of wind turbine 10 to increase the power production of wind turbine 10 based on at least the flow parameter of rotor blade 26. More specifically, in the exemplary embodiment, controller 28 determines 122 at least one statistical relation between the flow parameters detected by sensor 30. Such statistical relations may include, without limitation, a relation between separation point and/or reattachment point and airfoil chord, blade span, angle of attack, and/or Reynolds number. In the exemplary embodiment, at least some detections 110 indicative of a flow separation include, without limitation, a shear stress of approximately zero at the rotor blade surface, a velocity gradient of approximately zero at the rotor blade surface, and/or a pressure gradient of greater than zero at the rotor blade surface. Moreover, in the exemplary embodiment, controller 28 may determine a size of the separation bubble.

In the exemplary embodiment, controller 28 generates 124 an operating command based at least on the statistical relation, and transmits the operating command to actuator 40 for use in stimulating 126 rotor blade 26 to create turbulence. In such an embodiment, actuator 40 may vibrate, rotate, and/or stimulate 126 rotor blade 26 in response to receiving the operating command to create turbulence in the airflow.

Moreover, in another embodiment, first sensor 32 may detect 110 a first flow parameter of first portion 34, and second sensor 36 may detect 110 a second flow parameter of second portion 38. In such an embodiment, controller 28 may determine 122 a "separation point" and/or a "separation zone" and generate 124 a first operating command for first actuator 42 and a second operating command for second actuator 44 such that first portion 34 and second portion 38 may be stimulated 126 based on the first flow parameter and the second flow parameter, respectively.

In the exemplary embodiment, sensor 30 enables providing feedback associated with the operation of wind turbine 10 to controller 28. As such, in the exemplary embodiment, controller 28 may adjust the operating command and/or generate 124 a subsequent operating command to actuator 40 for stimulating rotor blade 26 based on at least the feedback provided by sensor 30.

Exemplary methods and systems for increasing a power production of a wind turbine are described above in detail. The embodiments describe herein enable increasing an energy capturing capability of the wind turbine at any wind speed, such as low wind speeds, and/or any angle of attack, such as high angles of attack. Additional features of the embodiments described herein may include an increase in driving torque, energy extraction, and/or power production.

The methods and systems are not limited to the specific embodiments described herein, but rather, components of the methods and systems may be utilized independently and separately from other components described herein. For example, the methods and systems described herein may have other industrial and/or consumer applications and are not limited to practice with wind turbines as described herein. Rather, the present invention can be implemented and utilized in connection with many other industries.

As used herein, an element or step recited in the singular and proceeded with the word "a" or "an" should be understood as not excluding plural said elements or steps, unless such exclusion is explicitly stated. Further, references to "one embodiment" are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for increasing power production of a wind turbine including a rotor, at least one rotor blade coupled to the rotor, at least one sensor, a first actuator coupled to a first portion of the rotor blade, a second actuator coupled to a second portion of the rotor blade, and a controller communicatively coupled to the sensor, said method comprising:
   detecting, using the sensor, an airflow parameter of the rotor blade; and,
   controlling, using the controller, operation of the wind turbine to actuate at least one of the first actuator and the second actuator to reduce a flow separation at the rotor blade proximate to the first portion and the second portion, respectively, based at least partially on the airflow parameter of the rotor blade.

2. A method in accordance with claim 1, wherein detecting an airflow parameter further comprises detecting at least one of an air pressure, an air pressure gradient, a wind velocity, and a wind velocity gradient.

3. A method in accordance with claim 1, further comprising:
stimulating the rotor blade;
receiving feedback associated with the stimulation of the rotor blade; and,
adjusting the stimulation of the rotor blade based at least partially on the feedback.

4. A method in accordance with claim 1, wherein controlling operation of the wind turbine further comprises vibrating the rotor blade.

5. A method in accordance with claim 1, wherein controlling operation of the wind turbine further comprises rotating the rotor blade about a rotor blade axis.

6. A controller for increasing power production of a wind turbine including a rotor, at least one rotor blade coupled to the rotor, at least one sensor operatively coupled to the rotor blade, a first actuator coupled to a first portion of the rotor blade, and a second actuator coupled to a second portion of the rotor blade, said controller configured to:
receive, from the sensor, data indicative of an airflow parameter of the rotor blade; and,
control operation of the wind turbine to actuate at least one of the first actuator and the second actuator to reduce a flow separation at the rotor blade proximate to the first portion and the second portion based at least partially on the airflow parameter of the rotor blade.

7. A controller in accordance with claim 6, further configured to:
receive feedback associated with the stimulation of the rotor blade; and,
adjust the stimulation of the rotor blade based at least partially on the feedback.

8. A controller in accordance with claim 6, further configured to vibrate the rotor blade.

9. A controller in accordance with claim 6, further configured to rotate the rotor blade about a rotor blade axis.

10. A controller in accordance with claim 6, further configured to increase a lift force of the rotor blade.

11. A controller in accordance with claim 6, further configured to decrease a drag force of the rotor blade.

12. A system for increasing power production of a wind turbine, said system comprising:
a rotor;
at least one rotor blade coupled to said rotor;
at least one sensor configured to detect an airflow parameter of said rotor blade;
a first actuator coupled to a first portion of said rotor blade, said first actuator configured to stimulate said first portion of said rotor blade,
a second actuator coupled to a second portion of said rotor blade, said second actuator configured to stimulate said second portion of said rotor blade; and,
a controller communicatively coupled to said sensor, said controller configured to:
receive, from the sensor, data indicative of the airflow parameter of said rotor blade; and,
control operation of the wind turbine to reduce a flow separation at the rotor blade based at least partially on the airflow parameter of said rotor blade.

13. A system in accordance with claim 12, wherein said sensor is configured to detect at least one of an air pressure, an air pressure gradient, a wind velocity, and a wind velocity gradient.

14. A system in accordance with claim 12, wherein a first sensor is coupled to a first portion of said rotor blade, and a second sensor is coupled to a second portion of said rotor blade.

15. A system in accordance with claim 12,
wherein said controller is further configured to:
receive feedback associated with the stimulation of said rotor blade; and,
adjust the stimulation of said rotor blade based at least partially on at least the feedback.

16. A system in accordance with claim 12, wherein said controller is further configured to vibrate said rotor blade.

17. A system in accordance with claim 12, wherein said controller is further configured to rotate said rotor blade about a rotor blade axis.

18. A controller in accordance with claim 12, said controller further configured to at least one of increase a lift force of said rotor blade.

* * * * *